(12) United States Patent
Reußwig et al.

(10) Patent No.: US 11,073,188 B2
(45) Date of Patent: Jul. 27, 2021

(54) OSCILLATION DAMPER AND METHOD FOR MANUFACTURING AN OSCILLATION DAMPER

(71) Applicant: Sumitomo Riko Company Limited, Aichi (JP)

(72) Inventors: Henning Reußwig, Hasselroth (DE); Jörg Ditzel, Freigericht (DE); Sebastian Bös, Brachttal (DE); Christian Freund, Bad Soden-Salmünster (DE)

(73) Assignee: Sumitomo Riko Company Limited, Aichi (JP)

( * ) Notice: Subject to any disclaimer, the term of this patent is extended or adjusted under 35 U.S.C. 154(b) by 140 days.

(21) Appl. No.: 16/504,358

(22) Filed: Jul. 8, 2019

(65) Prior Publication Data

US 2020/0018372 A1    Jan. 16, 2020

(30) Foreign Application Priority Data

Jul. 11, 2018  (DE) ..................... 10 2018 005 492.7

(51) Int. Cl.
*F16F 7/108*   (2006.01)
*F16F 7/00*    (2006.01)

(52) U.S. Cl.
CPC .......... *F16F 7/108* (2013.01); *F16F 2222/08* (2013.01); *F16F 2224/02* (2013.01);
(Continued)

(58) Field of Classification Search
CPC .... F16F 7/108; F16F 2222/08; F16F 2224/02; F16F 2224/025; F16F 2224/0208; F16F 2226/04
See application file for complete search history.

(56) References Cited

U.S. PATENT DOCUMENTS 3,113,640 A * 12/1963 Stedman ................. F16F 7/108
                                                188/378
4,172,591 A * 10/1979 Craig ...................... B60G 11/20
                                                267/154
(Continued)

FOREIGN PATENT DOCUMENTS

CN     200955561      10/2007
CN     104728326      6/2015
(Continued)

OTHER PUBLICATIONS

Office Action of Germany Counterpart Application, with English translation thereof, dated Apr. 30, 2019, pp. 1-12.
(Continued)

*Primary Examiner* — Melody M Burch
(74) *Attorney, Agent, or Firm* — JCIPRNET

(57) ABSTRACT

An oscillation damper is provided and includes: a holder for mounting the oscillation damper on an object to be damped; a damping mass; and a coupling device designed to mount the damping mass on the holder. The coupling device includes: a damping mass mounting element rigidly connectable to the damping mass; a holder mounting element rigidly connectable to the holder; and a spring element resiliently mechanically coupling the damping mass mounting element to the holder mounting element. A method for manufacturing an oscillation damper is further provided.

12 Claims, 12 Drawing Sheets

(52) U.S. Cl.
CPC . *F16F 2224/025* (2013.01); *F16F 2224/0208* (2013.01); *F16F 2226/04* (2013.01)

(56) References Cited

U.S. PATENT DOCUMENTS

| | | | | |
|---|---|---|---|---|
| 2009/0257838 | A1* | 10/2009 | Ostermann | F16F 7/108 408/143 |
| 2011/0079478 | A1* | 4/2011 | Gustavsson | F16F 7/104 188/380 |
| 2011/0209958 | A1 | 9/2011 | Badre-Alam et al. | |
| 2016/0252149 | A1* | 9/2016 | Scharf | F16F 13/10 267/140.13 |
| 2020/0171333 | A1* | 6/2020 | Carroccia | A62B 35/04 |

FOREIGN PATENT DOCUMENTS

| | | |
|---|---|---|
| DE | 10214417 | 8/2003 |
| DE | 102005009677 | 9/2006 |
| DE | 102014115416 | 4/2016 |
| FR | 2883056 | 9/2006 |
| JP | 783277 A * | 3/1995 |

OTHER PUBLICATIONS

"Office Action of China Counterpart Application", dated Nov. 17, 2020, with English translation thereof, p. 1-p. 16.

* cited by examiner

OSCILLATION DAMPER AND METHOD FOR MANUFACTURING AN OSCILLATION DAMPER

CROSS-REFERENCE TO RELATED APPLICATION

This application claims the priority of Germany patent application serial no. 10 2018 005 492.7, filed on Jul. 11, 2018. The entirety of the above-mentioned patent application is hereby incorporated by reference herein and made a part of this specification.

TECHNICAL FIELD

The disclosure relates to an oscillation damper and a method for manufacturing an oscillation damper. Moreover, the disclosure is in the field of bearing technology, in particular in the field of oscillation damper technology.

BACKGROUND ART

Oscillation dampers are used in particular in mobile devices and vehicles to avoid or reduce unwanted vibrations and oscillations of components. For this purpose, said oscillation dampers often have to comply with complex geometries or have to be mounted in spatially limited volumes, whereby manufacture and installation of the oscillation dampers are often made difficult. Further, conventionally, the elastomeric springs are manufactured by vulcanization between the damping mass and the holder element, requiring insertion of the damping mass and the holder element into the vulcanization tool. Consequently, large, and therefore cost-intensive tools are necessary.

SUMMARY

The present disclosure provides an oscillation damper with a simplified manufacturing and mounting process and an increased service life.

This disclosure can be achieved by providing an oscillation damper and a method for manufacturing an oscillation damper according to the independent claims. Preferred embodiments form the subject matter of the dependent claims.

One aspect relates to an oscillation damper including: a holder configured to mount the oscillation damper on an object to be damped; a damping mass; and a coupling device, configured to mount the damping mass on the holder. The coupling device includes: a damping mass mounting element that is rigidly connectable to the damping mass, a holder mounting element that is rigidly connectable to the holder, and a spring element that resiliently mechanically couples the damping mass mounting element with the holder mounting element. The spring element can be materially and/or positively or otherwise bonded to the holder mounting element and/or the damping mass mounting element. For example, the spring element can be bonded to the holder mounting element and/or the damping mass mounting element by vulcanization, gluing or others. The spring element can be vulcanized both to the holder mounting element and to the damping mass mounting element, wherein vulcanization can take place in a tool in which the holder mounting element and the damping mass mounting element are inserted.

Advantageously, a simple manufacture of the oscillation damper is made possible by the configuration of the oscillation damper, since the coupling device can be manufactured separately from the damping mass, such as in a small tool. Subsequently, the coupling device can be easily connected to the damping mass and the holder. It is not necessary here to insert the damping mass into a vulcanization tool in order to manufacture the oscillation damper. Due to the modular design of the oscillation damper, the shape and properties of the oscillation damper can be easily adapted to the conditions of use. Thus, a flexible adaptation of the oscillation damper to an existing installation space and/or a required geometry and/or size of the oscillation damper is made possible. The oscillation damper can be adapted to e.g. required complex geometries and/or to a small available installation space in a simple manner. A manufacture of the oscillation damper according to a modular principle can be made possible. Thus, it is easily possible to produce an oscillation damper with one or more spring elements and one or more damping masses (for example, with different mass weights and/or geometries).

Here, the oscillation damper is to be understood as a special type of oscillation absorber, wherein the oscillation damper is attached to the object to be damped. The damping mass and the spring element together form an oscillation system or a single-mass oscillator, the natural frequency of which is adjustable to the oscillation frequency of the object to be damped. The oscillation damper may be designed to be mounted in a vehicle, for example in a vehicle door.

The holder is designed to mount the oscillation damper on the object to be damped, such as a vehicle door. Here, the holder is designed to transmit mechanical oscillation energy from the object to be damped to the oscillation damper. In this case, the holder may have any shape or geometry, wherein the shape of the holder can be adapted to the object to be damped. The holder may have a mounting base with at least one surface, which is complementary to a surface of the object to be damped. The holder may in this case be mounted on the object to be damped by, for example, screwing and/or gluing and/or pressing and/or clipping and/or riveting. The holder may have at least one mounting hook for prefixing the holder to the object to be damped during assembly of the oscillation damper, wherein the mounting hook may be arranged on the mounting base. The holder may include at least one mounting arm, such as a pair of mounting arms, for connection to the coupling device. The mounting arm may extend substantially perpendicularly from the mounting base. However, the holder is not limited to this, but the mounting arm may also extend at an angle between about 30° and about 150°, preferably about 45° and about 135°, more preferably about 60° and about 120° from the mounting base. In other words, the mounting arm can also extend obliquely, such as obliquely in the direction of the damping mass or in a direction away from the damping mass, from the mounting base. The angle can be adapted to the existing installation space for the oscillation damper. The holder may be formed from a formed sheet metal and/or formed from a plastic and/or composite material.

The damping mass may be formed as an arbitrarily shaped damping mass, wherein damping properties of the oscillation damper may be adjustable by adjusting the shape and/or the mass of the damping mass. The damping mass may for example be substantially cylindrical and may be formed from a metal and/or a plastic and/or a composite material.

The coupling device is designed to mount the damping mass on the holder. Here, the oscillation damper may have one or more coupling devices to mount the damping mass on the holder. The oscillation damper may include two coupling devices, which are each connected to the damping mass at two opposite axial ends of the damping mass. By adjusting a geometric arrangement of the coupling devices between the damping mass and the holder and by adapting a number of coupling devices provided, damping properties of the oscillation damper can be adjustable.

The coupling device includes at least one damping mass mounting element, which is rigidly connectable to the damping mass or is rigidly connected to it in the mounted state. In the context of this description, rigidly connected is to be understood as meaning that a translatory and/or rotational relative movement between the rigidly connected elements is inhibited or prevented or blocked. The damping mass mounting element may in this case be formed of a rigid material. The rigid material of the damping mass mounting element may include a metal and/or a plastic and/or a composite material. The damping mass mounting element may further be rigidly connected to the damping mass such that a rotation between the damping mass mounting element and the damping mass is prevented. The damping mass mounting element may be in direct, physical contact with the damping mass. No additional layers of material, such as an elastomer layer, are disposed between the damping mass mounting element and the damping mass.

The coupling device includes at least one holder mounting element, which is rigidly connectable to the holder or is rigidly connected to it in the mounted state. The holder mounting element may in this case be formed of a rigid material. The rigid material of the holder mounting element may include a metal and/or a plastic and/or a composite material. The holder mounting element may further be rigidly connected to the holder such that a rotation between the holder mounting element and the holder is prevented. The holder mounting element may be in direct physical contact with the holder. No additional layers of material, such as an elastomeric layer, are disposed between the holder mounting element and the holder.

The coupling device includes at least one spring element, which resiliently mechanically couples the damping mass mounting element with the holder mounting element. Here, the at least one spring element is formed such that mechanical energy and/or oscillations can be transmitted from the holder to the damping mass. The spring element may be formed of an elastomer. In this case, the spring element can surround or enclose the damping mass mounting element and/or the holder mounting element at least partially circumferentially with respect to a longitudinal axis of the coupling device. The spring element may be disposed between the damping mass mounting element and the holder mounting element, wherein the spring element preferably prevents or blocks direct, physical contact between the damping mass mounting element and the holder mounting element. The spring element may have a substantially hollow cylindrical or hollow cone-shaped design. By adjusting the shape and/or the material of the spring element, oscillation properties of the oscillation damper can be adjusted. The spring element may be molded to or around the damping mass mounting element and/or the holder mounting element in a tool. In other words, the spring element can be vulcanized to the damping mass mounting element and/or the holder mounting element. The shape of a cross section of the spring element in a plane perpendicular to a spring element axis may be circular, elliptical and/or oval-shaped. However, the spring element is not limited to such a configuration of the shape of the cross section, but may have any shape of the cross section. Here, the shape of the cross-section does not have to have any symmetries, but it may have at least one point symmetry and/or at least one mirror symmetry. By adjusting the shape of the cross-section, elastic properties of the spring element, for example the rigidity, can be adjusted in different radial directions.

The damping mass may have a damping mass mounting recess, wherein the damping mass mounting element is pressable into the damping mass mounting recess, such as directly, or in the mounted state is pressed thereinto.

This allows a secure fit of the damping mass mounting element to the damping mass in the mounted state of the oscillation damper in a simple manner. The mounted state of the oscillation damper is the state in which the damping mass is mounted on the holder by the coupling device. In the mounted state, the damping mass mounting element can be pressed into the damping mass or be connected to the damping mass. Preferably, in the mounted state in the damping mass mounting recess, the damping mass mounting element directly borders or lies adjacent to the damping mass. The damping mass mounting recess and the damping mass mounting element may for example be formed substantially cylindrical.

At least one abutment element can be arranged on the holder mounting element, wherein the at least one abutment element abuts an inner surface of the damping mass mounting recess and/or on an outer surface of the damping mass mounting element upon radial displacement.

The inner surface of the damping mass mounting recess may in this case include a circumferential inner surface of the damping mass mounting recess. As a result, the holder mounting element and/or the spring element can be protected from damage by large and/or strong and/or abrupt deflections of the oscillation damper. In other words, by means of the abutment element, a radial displacement of the holder mounting element relative to the damping mass can be limited. The abutment element may be designed such that it rests against the inner surface of the damper mass mounting recess even without radial displacement of the holder mounting element relative to the damping mass. The at least one abutment element can be designed as an elastic abutment element, that is to say be formed from an elastomer, as a result of which the elastic properties of the coupling device can be adapted or adjusted. The at least one abutment element may protrude radially outward with respect to the holder mounting element. The at least one abutment element may preferably include at least one first abutment element and at least one second abutment element, wherein the at least one first abutment element may at least partially have a different shape and/or different elastic properties than the at least one second abutment element. As a result, elastic properties of the coupling device along different radial directions with respect to a longitudinal axis of the coupling device can be adjustable. The at least one abutment element may further include a plurality of abutment elements, wherein the plurality of abutment elements are arranged at equal intervals in the circumferential direction with respect to the longitudinal axis of the coupling device on the holder mounting element. In this way, uniform elastic properties of the coupling device along different radial directions with respect to the longitudinal axis of the coupling device can be made possible. Alternatively, the at least one abutment element may further include a plurality of abutment elements, wherein the plurality of abutment elements are arranged at non-equal intervals in the circumferential direction with respect to the longitudinal axis of the coupling device on the holder mounting element. As a result, elastic properties of the coupling device along different radial directions with respect to a longitudinal axis of the coupling device can be adjustable.

The at least one abutment element may be formed integrally with the spring element.

In this way, a simplified and cost-effective manufacture of the coupling device can be made possible.

The spring element may further include a spring region and a abutment region. The abutment region here is a region of the spring element which contains the at least one abutment element. The abutment region may adjoin the holder mounting element in the radial direction with respect to the longitudinal axis. The spring region here is a region of the spring element separate from the abutment region, which is designed to transmit mechanical energy or oscillations to the damping mass or to the damping mass mounting element. By such a separation of the abutment region and the spring region, the spring region important for the function of the oscillation damper can be protected against damage in the case of strong deflections of the damping mass.

The holder may have a holder mounting recess, wherein the holder mounting element is pressable into the holder mounting recess, such as directly, or in the mounted state is pressed thereinto.

In this way, a secure fit between the holder and the coupling device can be ensured in a simple manner. The holder mounting element can be rigidly connectable to the holder by being pressed into the holder mounting recess. The holder mounting recess and the holder mounting element may be formed substantially cylindrical, for example.

The holder mounting element may directly border or lie adjacent the holder in a pressed-in state in the holder mounting recess.

Here, the abutment or bordering of the holder mounting element to the holder or in the holder mounting recess is to be understood as a direct physical contact between the holder mounting element and the holder. No additional material layers, such as an elastomer layer, are disposed between the holder mounting element and the holder. In this way, a secure fit of the holder mounting element on the holder can be ensured in a simple manner.

A diameter of the damping mass mounting element may be smaller than a diameter of the holder mounting recess.

A maximum diameter of the damping mass mounting element is smaller than a minimum diameter of the holder mounting recess. The diameter of the damping mass mounting element in this case is to be measured transversely to the longitudinal axis of the coupling device. The diameter of the holder mounting recess in this case is to be measured transversely, in particular perpendicularly to the longitudinal axis of the holder mounting recess. During an assembly process of the damping mass on the holder, the coupling device can be inserted through the holder or through the holder mounting recess of the holder and be pressed into the damping mass or the damping mass mounting recess. As a result, the assembly process of the damping mass on the holder can be performed in one process step. Here, the damping mass and the holder can be clamped into a tool, and the coupling device can be pressed in by means of a punch. Both the damping mass mounting element and the holder mounting element may have axial pressure surfaces that engage with the punch during the assembly process.

The holder mounting element may be formed substantially hollow cylindrical. Here, an abutment portion of the damping mass mounting element may be disposed at least partially radially surrounded by the holder mounting element, wherein an abutment configuration may be arranged radially inwardly protruding on the holder mounting element and/or radially outwardly protruding on the abutment portion of the damping mass mounting element in order to limit the radial displacement of the holder mounting element and the damping mass mounting element relative to each other.

The abutment configuration is an elastic abutment configuration or is formed from an elastomer.

The abutment configuration may be formed integrally with the spring element.

The damping mass and the damping mass mounting element can each have a fixation bore, so that the damping mass mounting element is connectable to the damping mass by means of a connection element or is connected thereto in the mounted state.

The fixation bore of the damping mass and the fixation bore of the damping mass mounting element are formed, such that the fixation bore of the damping mass and the fixation bore of the damping mass mounting element can be arranged concentrically, so that the damping mass mounting element is connectable to the damping mass by means of the connection element, wherein the connection element is received at least partially in the fixation bore of the damping mass and the fixation bore of the damping mass mounting element. A radial diameter of the fixation bore of the damping mass is substantially identical to a radial diameter of the fixation bore of the damping mass mounting element, substantially in this sense meaning to include minor environmental and production-related deviations. The fixation bore of the damping mass has a first fixation bore axis, wherein the first fixation bore axis is formed perpendicular to the longitudinal axis of the coupling device. The fixation bore of the damping mass mounting element has a second fixation bore axis, wherein the second fixation bore axis is formed perpendicular to the longitudinal axis of the coupling device. The first fixation bore axis may be identical to the second fixation bore axis or coincide with the second fixation bore axis. Here, the connection element can be designed as a screw and/or a rivet and/or a bolt.

The holder mounting element and/or the holder may have an anti-rotation configuration.

The holder mounting element may have a first axial projection extending along the longitudinal axis of the coupling device, and the holder may include a first projection receptacle, wherein the first axial projection is designed to engage the first projection receptacle to block a relative rotational movement between the coupling device and the holder. Alternatively or in addition, the holder mounting element may have a second projection receptacle, and the holder may have a second axial projection, which extends at least partially parallel to the longitudinal axis of the coupling device, wherein the second axial projection is designed to engage the second projection receptacle, to block a relative rotational movement between the coupling device and the holder. The anti-rotation configuration may also be advantageous during assembly of the holder mounting element to the holder, as, for example, when the holder mounting element is screwed to the holder, relative rotation of the components with respect to each other is prevented. Furthermore, by the anti-rotation configuration, a correct rotational arrangement of the components with respect to each other can be achieved.

The spring element can be designed to have different spring properties in two mutually orthogonal radial directions.

The two mutually orthogonal directions may each be orthogonal to the longitudinal axis of the coupling device. The spring element can be designed as an oval spring element with a substantially oval cross-section perpendicular to the longitudinal axis of the coupling device. As a result, the spring properties of the spring element along two mutually orthogonal directions can be adapted to possible operating conditions of the oscillation damper.

The spring element may have an adjustment recess.

The adjustment recess may in this case be formed as a bore through the spring element, i parallel and/or concentric with the longitudinal axis of the coupling device. As a result, spring properties of the spring element can be adjusted and adapted easily and cost-effectively. Preferably, the spring element may include one or more adjustment cavities. The adjustment recess can be introduced into the spring element during injection molding or vulcanization of the spring element, or can also be introduced into the spring element in a subsequent step, for example by means of drilling.

The spring element is not injected or vulcanized around the damping mass. In this way, a smaller tool can be used and heating of the damping mass during injection molding or during vulcanization, which is disadvantageous with regard to manufacturing technology, can be avoided.

The spring element may be designed for thrust load, wherein the spring element may have a low spring rate and/or a low damper resonance frequency. The damper resonance frequency may be set to below 40 Hz.

The spring element may be designed for tensile and/or compressive loading, wherein the spring element may have a high spring rate and/or a high damper resonance frequency. The damper resonance frequency may be set to above 40 Hz.

The damping mass mounting element may at least partially be received in a holder mounting recess of the holder. In this way, loss prevention of the oscillation damper can be made possible, wherein a connection between the damping mass and the holder cannot be completely released even in case of an elastomer breakage of the spring element.

The holder mounting element may at least partially be received in a damping mass mounting recess of the damping mass. In this way, loss prevention of the oscillation damper can be made possible, wherein a connection between the damping mass and the holder cannot be completely released even in case of an elastomer breakage of the spring element.

The damping mass mounting element may have at least one axial compression groove, which is formed at least partially parallel to the longitudinal axis of the coupling device. The at least one compression groove may in this case be designed to be compressed when the damping mass mounting element is being pressed into the damping mass and thus enables a secure fit of the damping mass mounting element to the damping mass.

The damping mass mounting element may have at least one first position element, which is at least partially formed as a groove and/or at least partially as a protruding projection. The at least one first position element may be formed parallel to the longitudinal axis of the coupling device. The at least one first position element may in this case be designed to at least partially engage the damping mass when the damping mass mounting element is being pressed into the damping mass, thereby simplifying alignment of the damping mass mounting element with respect to the damping mass.

The holder mounting element may have at least one second position element, which is at least partially formed as a groove and/or at least partially as a protruding projection. The at least one second position element may be formed parallel to the longitudinal axis of the coupling device. The at least one second position element may in this case be designed to at least partially engage the holder when the holder mounting element is being connected to the holder, thereby simplifying alignment of the holder mounting element with respect to the holder.

The damping mass mounting element may include at least one spoke element, which is formed radially with respect to the longitudinal axis of the coupling device. In this case, the at least one spoke element may be formed integrally with the damping mass mounting element. Alternatively, the at least one spoke element may be formed from a different material and with different mechanical properties than a material of the damping mass mounting element. The at least one spoke element may be designed to increase a structural integrity or rigidity of the damping mass mounting element. However, the damping mass mounting element is not limited to spoke elements. Rather, the damping mass mounting element may not have cavities and/or recesses, i.e. be molded from full material as well. The damping mass mounting element may also be designed as a pot-like mounting element, or have a honeycomb-like internal structure along a plane perpendicular to an axis of the damping mass mounting element.

One aspect relates to a method for manufacturing an oscillation damper, comprising providing an damping mass and a holder for mounting the oscillation damper to an object to be damped; rigidly connecting a damping mass mounting element of a coupling device with the damping mass; and rigidly connecting a holder mounting element of the coupling device to the holder, wherein the damping mass mounting element is resiliently mechanically coupled to the holder mounting element by a spring element.

The above description with regard to the oscillation damper applies accordingly to the method for manufacturing an oscillation damper.

The method may further include introducing the coupling device through a holder mounting recess of the holder, wherein connecting the damping mass mounting element to the damping mass and connecting the holder mounting element to the holder occur substantially simultaneously.

In this way, a manufacturing process of the oscillation damper and/or a mounting process of the damping mass to the holder can be performed easily and cost-efficiently, such as in one mounting step.

BRIEF DESCRIPTION OF THE DRAWINGS

The disclosure will be further explained by exemplary embodiments illustrated in figures, which show.

DESCRIPTION OF EMBODIMENTS

Figure 1A:
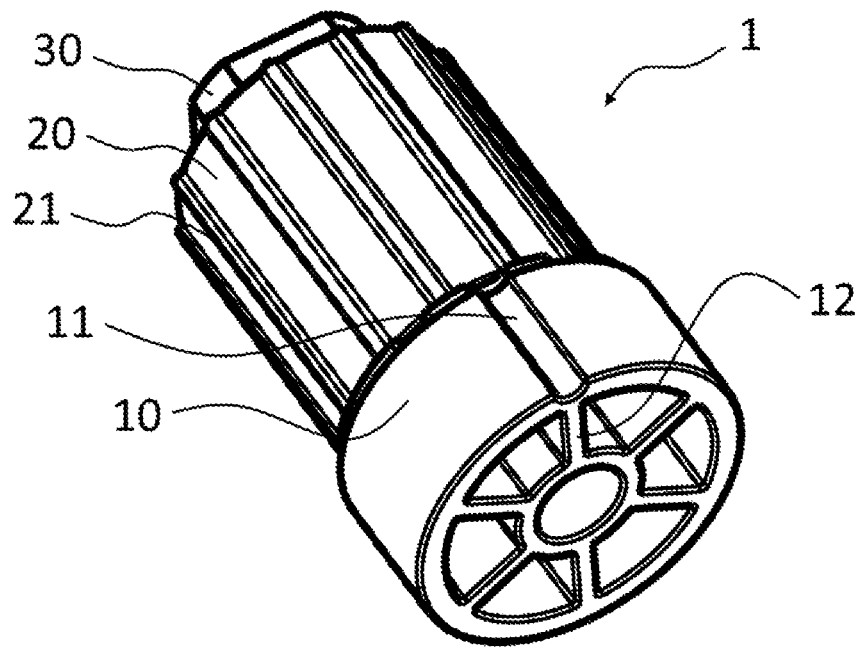
FIGS. 1A and 1B each shows a perspective view of a coupling device of an oscillation damper according to a first embodiment.
Figure 1B:
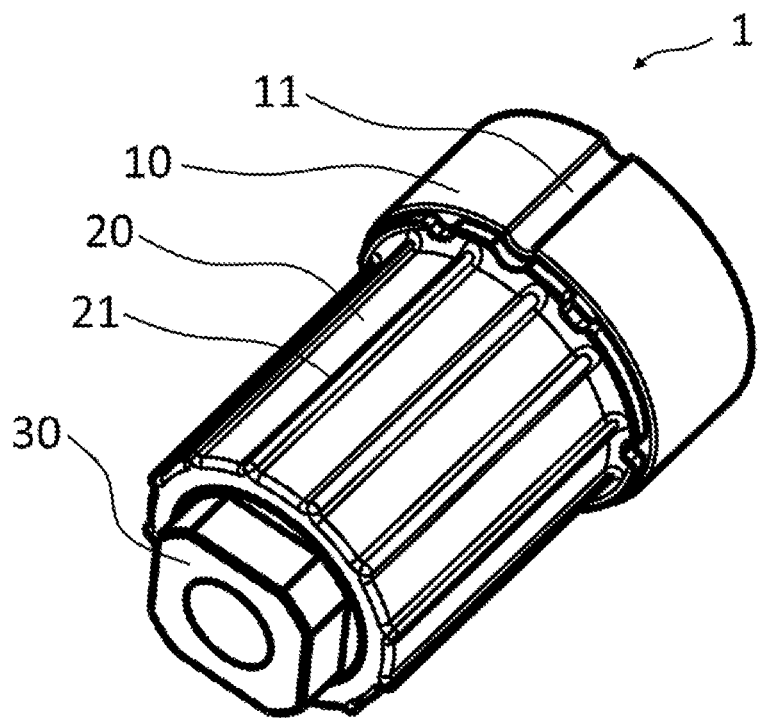

FIGS. 1A and 1B each show a perspective view of a coupling device 1 of an oscillation damper according to a first embodiment. The coupling device 1 includes a damping mass mounting element 10, which is formed substantially cylindrically. In this case, the damping mass mounting element 10 includes an axial compression groove 11, which simplifies pressing-in of the damping mass mounting element 10 into a damper mass 40. The damping mass mounting element 10 further includes six radial spoke elements 12, which increase a structural integrity of the damping mass mounting element 10 and enable a material expenditure for manufacturing the damping mass mounting element 10. However, the damping mass mounting element 10 is not limited to have six radial spoke elements 12, but may have at least two radial spoke elements 12, preferably at least three radial spoke elements 12, more preferably at least six and/or a maximum of 30 radial spoke elements 12, preferably a maximum of 24 radial spoke elements 12, more preferably a maximum of 18 radial spoke elements 12.

The coupling device 1 further includes a spring element 20, which is arranged on the damping mass mounting element 10. The spring element 20 is formed substantially cylindrically and has a plurality of (such as twelve) abutment elements 21, which project radially outward from the spring element 20. The spring element 20 is designed to transmit mechanical energy or oscillations from the holder mounting element 30 to the damping mass mounting element 10. However, the spring element 20 is not limited to have twelve abutment elements 21, but may have at least two abutment elements 21, preferably at least four abutment elements 21, more preferably at least six and/or a maximum of 48 abutment elements 21, preferably a maximum of 36 abutment elements 21, more preferably a maximum of 24 abutment elements 21.

The coupling device 1 further includes a holder mounting element 30, which is arranged on the spring element 20 and is at least partially surrounded by the spring element 20. The holder mounting element 30 has a projection with at least one edge along the longitudinal axis "A" of the coupling device 1. The projection may be formed polygonally, for example be square or octagonal. The at least one edge of the projection lies in a plane perpendicular to the longitudinal axis "A". The projection is in this case designed to be received in a complementary receptacle 52 of the holder 50 in order to provide an anti-rotation configuration against relative rotational movements between the holder 50 and the damping mass 40. The holder mounting element 30 further includes a connector receptacle 31 designed to engage a connector element to fix or secure the holder mounting element 30 and/or the oscillation damper to the holder 50.

The connector element may be designed as a fixing screw and/or as a fixing bolt and/or as a fixing rivet.

Figure 1C:
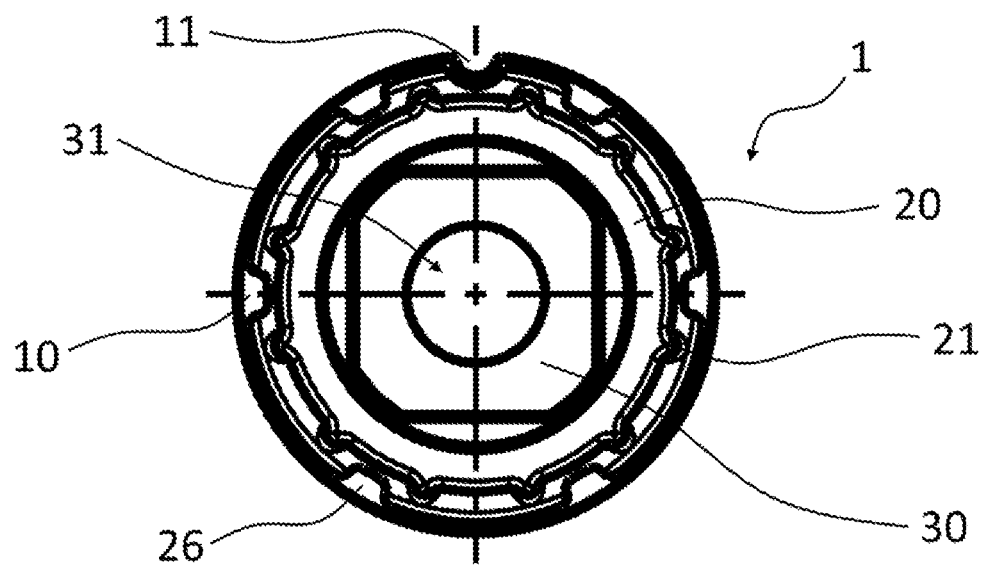
FIG. 1C shows a front view of the coupling device of FIGS. 1A and 1B along the longitudinal axis.

FIG. 1C shows a front view of the coupling device 1 of the oscillation damper according to the first embodiment along the longitudinal axis "A". Here, the coupling device 1 has a substantially circular cross-section. The abutment elements 21 are arranged at equal intervals in a circumferential direction about the longitudinal axis "A".

The damping mass mounting element 10 has axial pressure surfaces 26. The axial pressure surfaces 26 are designed to engage a mounting tool, for example a press-in punch, in an assembly process of the oscillation damper, to simplify or allow the assembly of the damping mass mounting element 10, such as a pressing of the damping mass mounting element 10 into the damping mass 40. In this case, the axial pressure surfaces 26 may be formed as a plurality of separate axial pressure surfaces 26 arranged in the circumferential direction with respect to the longitudinal axis "A" of the coupling device 1. In each case, two of the plurality of axial pressure surfaces 26 may each be arranged opposite one another with respect to the longitudinal axis "A". The plurality of axial pressure surfaces 26 may be arranged at equal or uniform intervals in the circumferential direction with respect to the longitudinal axis "A". Each axial pressure surface 26 of the plurality of axial pressure surfaces 26 may have a substantially identical surface, substantially in the context of the disclosure meaning to include minor environmental and production-related deviations.

Figure 1D:
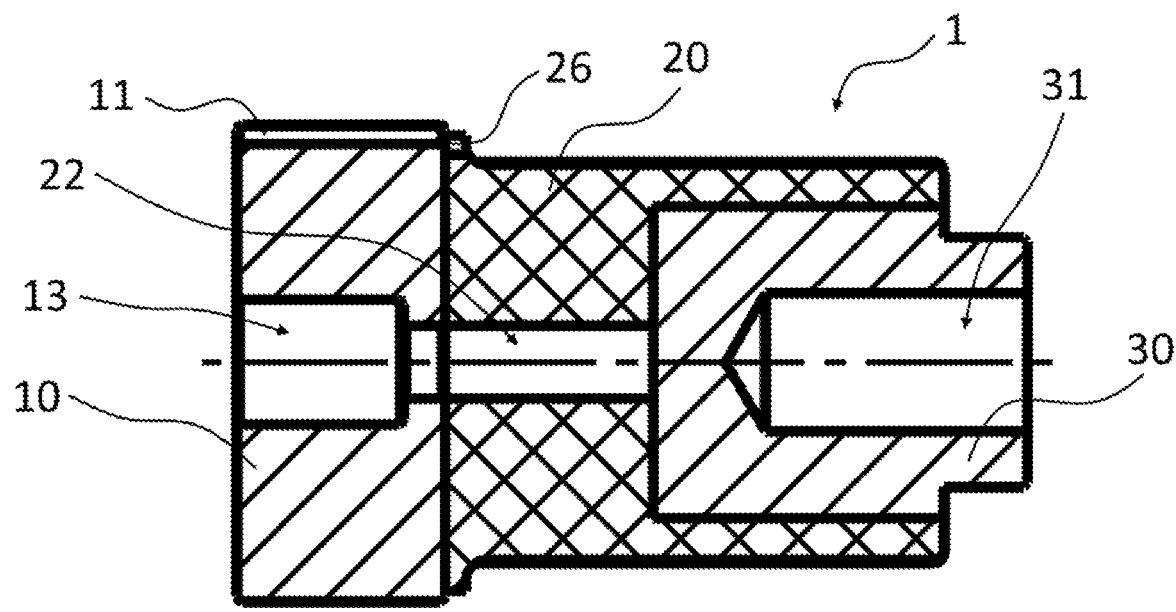
FIG. 1D shows a cross-sectional view of the coupling device of FIGS. 1A and 1B.

FIG. 1D shows a cross-sectional view of the coupling device 1 of the oscillation damper according to the first embodiment. The holder mounting element 30 is surrounded by the spring element 20 by over 50%. The spring element 20 has an adjustment recess 22, which is formed as a bore through the spring element 20, parallel and concentric with the longitudinal axis "A" of the coupling device 1. As a result, spring properties of the spring element 20 can be adjusted or adapted in a simple and cost-effective manner for example by adapting a diameter of the adjustment recess 22. In this case, the damping mass mounting element 10 has a central recess 13, which simplifies pressing-in of the damping mass mounting element 10 into the damping mass 40 and reduces material expenditure for manufacturing the damping mass mounting element 10.

Figure 1E:
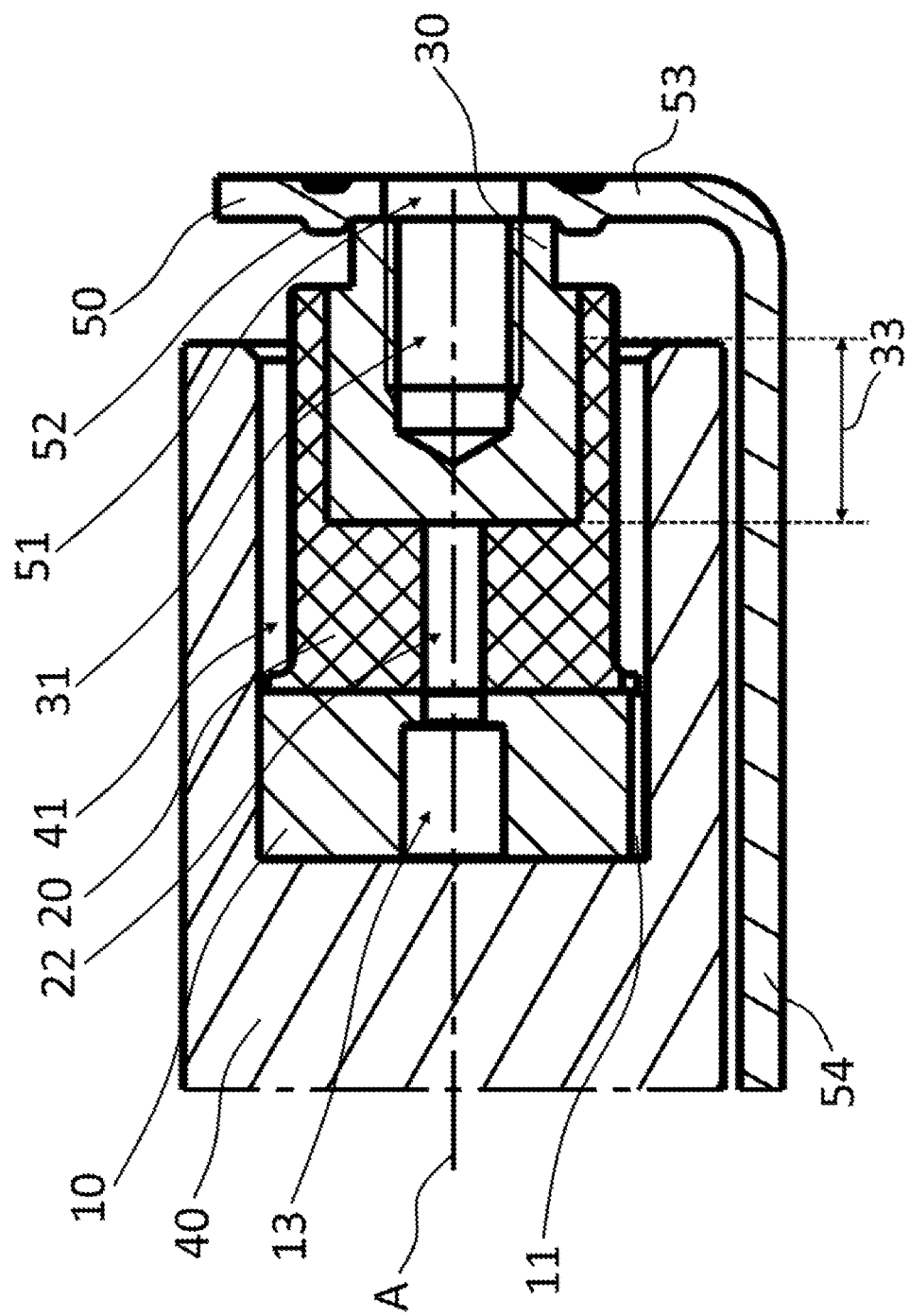
FIG. 1E shows a cross-sectional view of an oscillation damper according to the first embodiment in the mounted state.

FIG. 1E shows a cross-sectional view of the oscillation damper according to the first embodiment in the mounted state. In this case, the damping mass mounting element 10 is pressed into a damping mass mounting recess 41 of the damping mass 40. Here, the spring element 20 has only partial contact with the damping mass 40. In this case, the holder mounting element 30 is at least partially received in the complementary receptacle 52 of the holder 50. The connector receptacle 31 of the holder mounting element 30 and a connector receptacle 51 of the holder 50 are aligned with each other, so that a connector element in the connector receptacle 31 of the holder mounting element 30 and a connector receptacle 51 of the holder 50 can be received.

In this case, the holder 50 includes a mounting base 54 and at least one mounting arm 53. Here, the mounting base 54 and the at least one mounting arm 53 may be plate-like. In this case, the mounting base 54 and the at least one mounting arm 53 may be arranged or formed at an arm angle to one another. The arm angle is preferably between 60° and 120°, for example, substantially 90°. The mounting base 54 and the at least one mounting arm 53 may also be formed unitarily or integrally with one another or may be connectable to each other. The at least one mounting arm 53 may be resilient or elastic. The at least one mounting arm 53 is displaceable during an assembly process, so that the respective arm angle is increased. A restoring force of the at least one mounting arm 53 in the mounted state of the oscillation damper presses the coupling device pressed in the direction of the damping mass 40. In this way, furthermore, the spring element 20 can be biased. An adjustment of the restoring force, for example by choosing the respective arm angle and/or the material of the respective mounting arm 53, enables an adaptation of the elastic properties and/or of the damping properties of the respective spring element 20 or the respective coupling device 1.

The holder mounting element 30 is at least partially receivable in the damping mass mounting recess 41 in the mounted state of the oscillation damper. A region of the holder mounting element 30 that is at least partially receivable in the damping mass mounting recess 41 forms an overlap region 33. In other words, the coupling device 1 or the mounting-mounting element 30 may have an overlap region 33, which is at least partially receivable in the damping mass mounting recess 41 in the mounted state. The overlap region 33 enables loss prevention of the coupling device 1. The damping mass 40 in the mounted state is not completely released from the holder 50, even in the case of damage and/or destruction of the spring element 20.

Figure 2A:
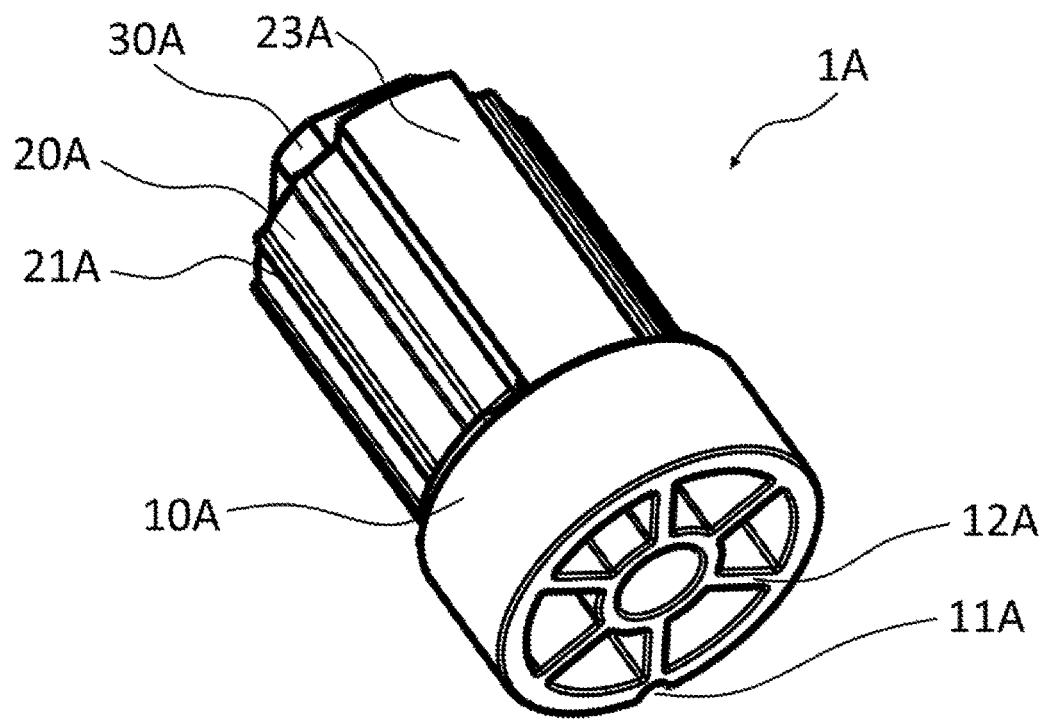
FIGS. 2A and 2B each shows a perspective view of a coupling device of an oscillation damper according to a second embodiment.
Figure 2B:
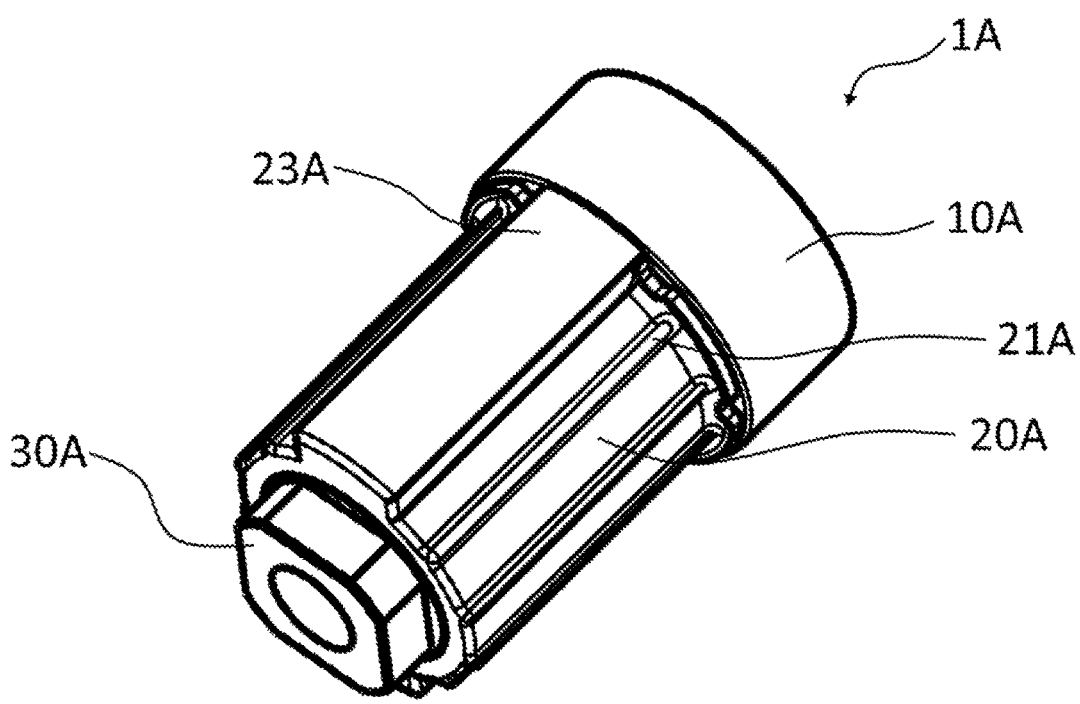

FIGS. 2A and 2B each show a perspective view of a coupling device 1A of an oscillation damper according to a second embodiment. The coupling device 1A includes a damping mass mounting element 10A, which is substantially cylindrical. In this case, the damping mass mounting element 10A includes an axial compression groove 11A, which simplifies pressing-in the damping mass mounting element 10A into a damping mass 40A. The damping mass mounting element 10A further includes six radial spoke elements 12A, which increase a structural integrity of the damping mass mounting element 10A and allow a material expenditure for manufacturing the damping mass mounting element 10A.

The coupling device 1A further includes a spring element 20A, which is arranged on the damping mass mounting element 10A. The spring element 20A is formed substantially cylindrically and has a plurality of (such as eight) abutment elements 21A, which project radially outward from the spring element 20A. The spring element 20A further has two adjustment projections 23A projecting radially outward from the spring element 20A, the adjustment projections 23A being designed to change or adjust spring properties of the spring element 20A along at least one radial direction. The spring element 20A is designed to transmit mechanical energy or oscillations from the holder mounting element 30A to the damping mass mounting element 10A.

The coupling device 1A further includes a holder mounting element 30A disposed on the spring element 20A and at least partially surrounded by the spring element 20A. The holder mounting element 30A has a square-like or octagonal-like projection along the longitudinal axis "A" of the coupling device 1A. Here, the projection is designed to be received in a complementary receptacle 52A of the holder 50A in order to provide an anti-rotation configuration against relative rotational movements between the holder 50A and the damping mass 40A. The holder mounting element 30A further includes a connector receptacle 31A designed to engage a connector element in order to fix or mount the holder mounting element 30A or the oscillation damper to the holder 50A. The connector element may be designed as a fixing screw and/or as a fixing bolt and/or as a fixing rivet.

Figure 2C:
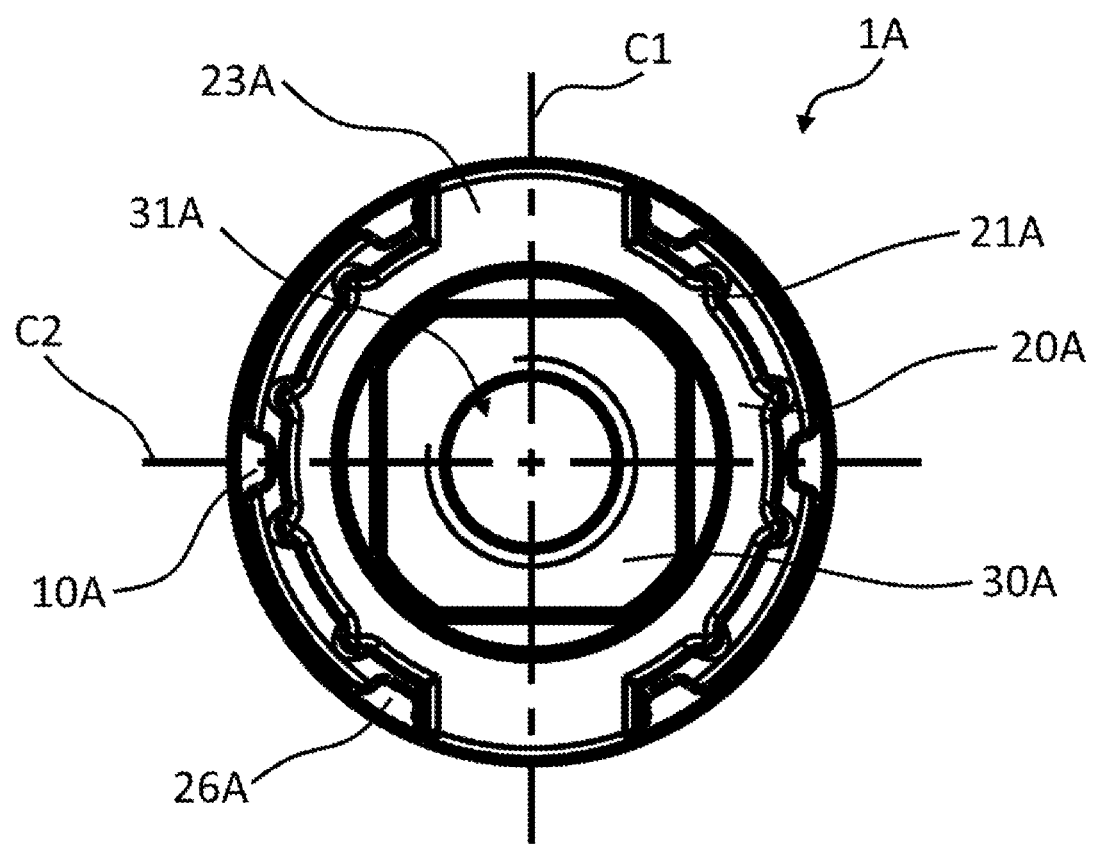
FIG. 2C shows a front view of the coupling device of FIGS. 2A and 2B along the longitudinal axis.

FIG. 2C shows a front view of the coupling device 1A of the oscillation damper according to the second embodiment along the longitudinal axis "A". In this case, the coupling device 1A has a substantially circular cross-section. The spring element 20A has a substantially oval-like cross-section due to the two adjustment projections 23A. The abutment elements 21A and the adjustment projections 23A are formed in mirror symmetry with respect to the plane C1.

The damping mass mounting element 10A has axial pressure surfaces 26A. The axial pressure surfaces 26A may be formed in accordance with the axial pressure surfaces 26 of the first embodiment.

Figure 2D:
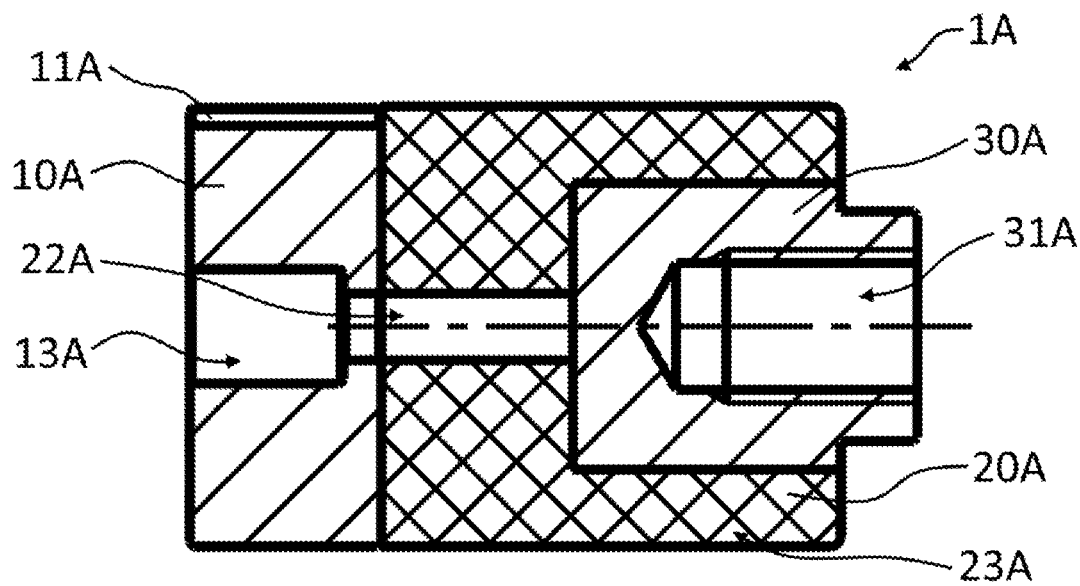
FIGS. 2D and 2E each shows a cross-sectional view of a coupling device of FIGS. 2A and 2B.
Figure 2E:
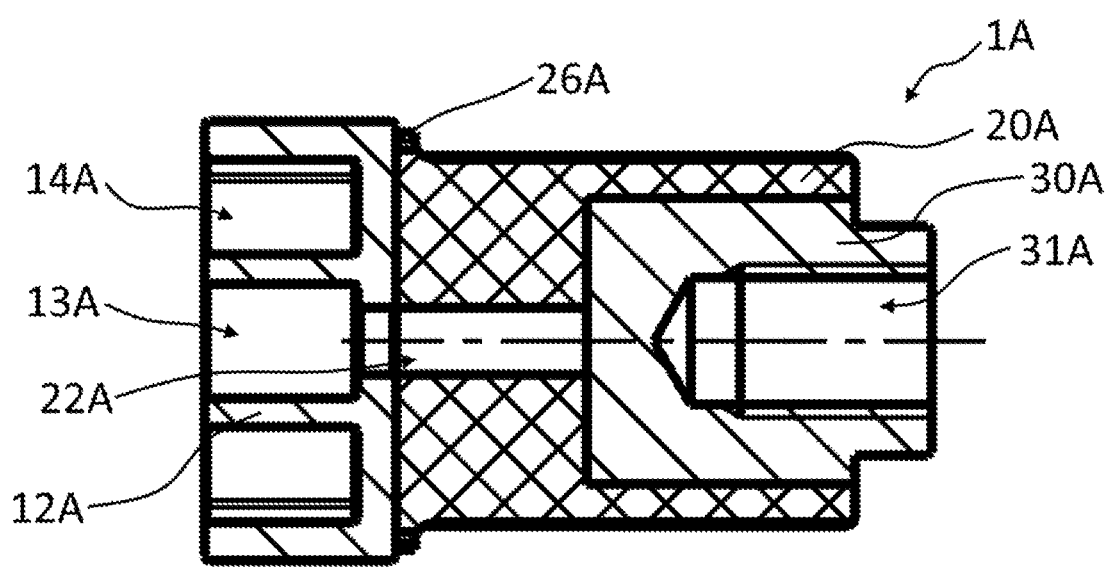

FIGS. 2D and 2E each show a cross-sectional view of the coupling device 1A of the oscillation damper according to the second embodiment along the cross-sectional plane C1 and the cross-sectional plane C2. The holder mounting element 30A is surrounded by the spring element 20A by over 50%. The spring element 20A has an adjustment recess 22A, which is formed as a bore through the spring element 20A, parallel and concentric with the longitudinal axis "A" of the coupling device 1A. As a result, spring properties of the spring element 20A can be adjusted or adapted in a simple and cost-effective manner for example by adapting a diameter of the adjustment recess 22A. The spring element 20A has a different radial diameter in the cross-sectional plane C1 and in the cross-sectional plane C2 due to the adjustment projections 23A. In this case, the damping mass mounting element 10A has a central recess 13A and spoke cavities 14A, which simplify pressing-in of the damping mass mounting element 10A into the damping mass 40A and reduce material expenditure for manufacturing the damping mass mounting element 10.

Figure 2F:
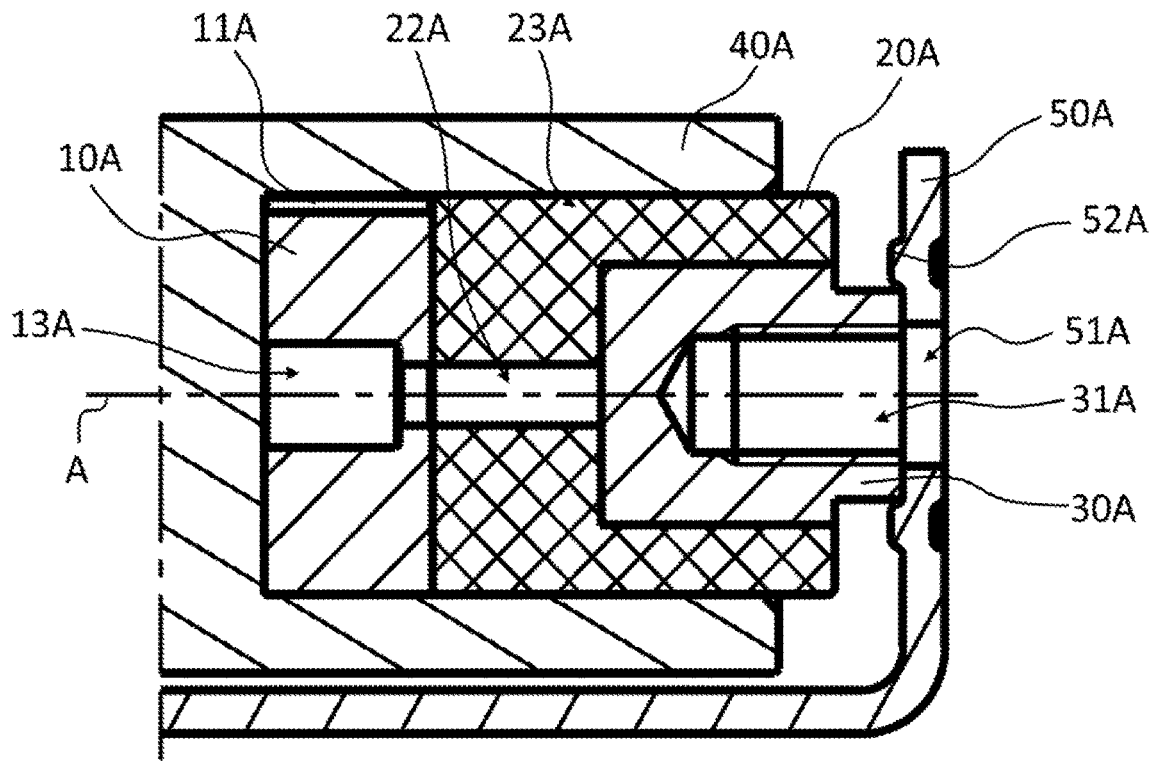
FIGS. 2F and 2G each shows a cross-sectional view of an oscillation damper according to the second embodiment in the mounted state.
Figure 2G:
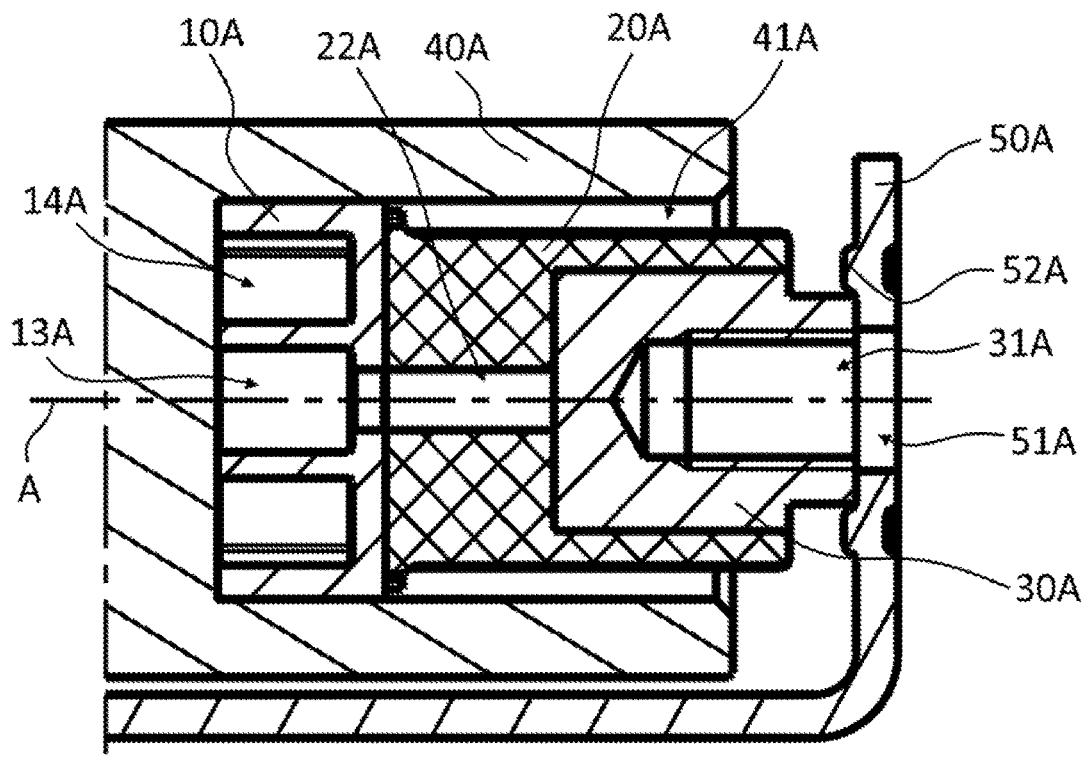

FIGS. 2F and 2G each show a cross-sectional view of the oscillation damper according to the second embodiment in the mounted state along the cross-sectional plane C1 and the cross-sectional plane C2. Here, the damping mass mounting element 10A is pressed into a damping mass mounting recess 41A of the damping mass 40A. In this case, the spring element 20A has direct contact with the damping mass 40A along the adjustment projections 23A. The holder mounting element 30A is at least partially received in the complementary receptacle 52A of the holder 50A. The connector receptacle 31A of the holder mounting element 30A and a connector receptacle 51A of the holder 50A are aligned with respect to each other, such that a connector element can be received in the connector receptacle 31A of the holder mounting element 30A and a connector receptacle 51A of the holder 50A.

In this case, the holder 50A may be designed in accordance with the holder 50 of the first embodiment. Further, the holder mounting element 30A may be formed in accordance with the holder mounting element 30 of the first embodiment.

Figure 3A:
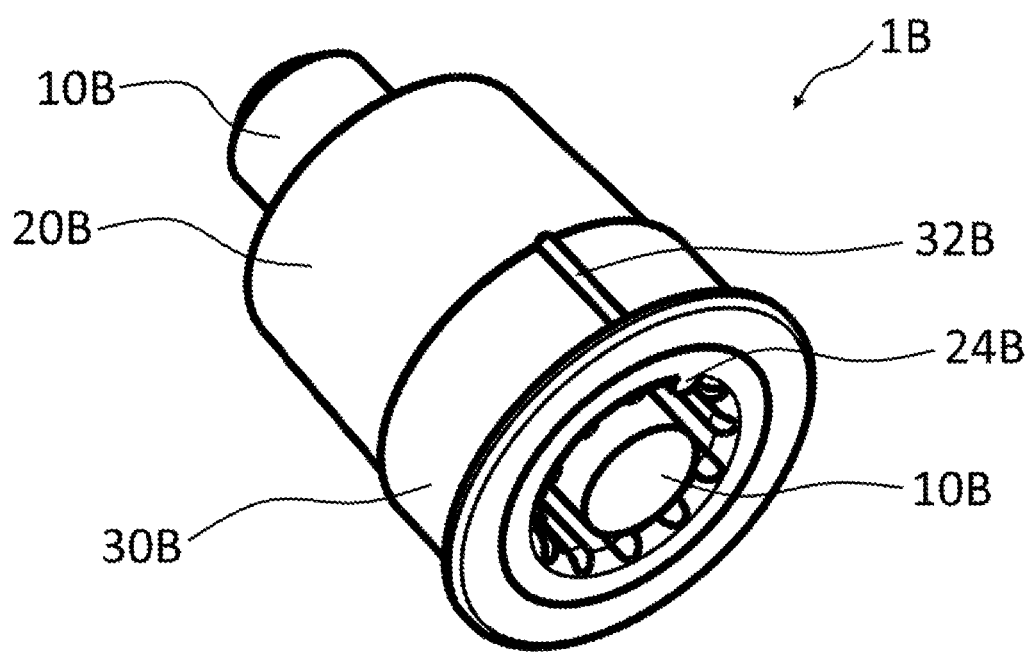
FIGS. 3A and 3B each shows a perspective view of a coupling device of an oscillation damper according to a third embodiment.
Figure 3B:
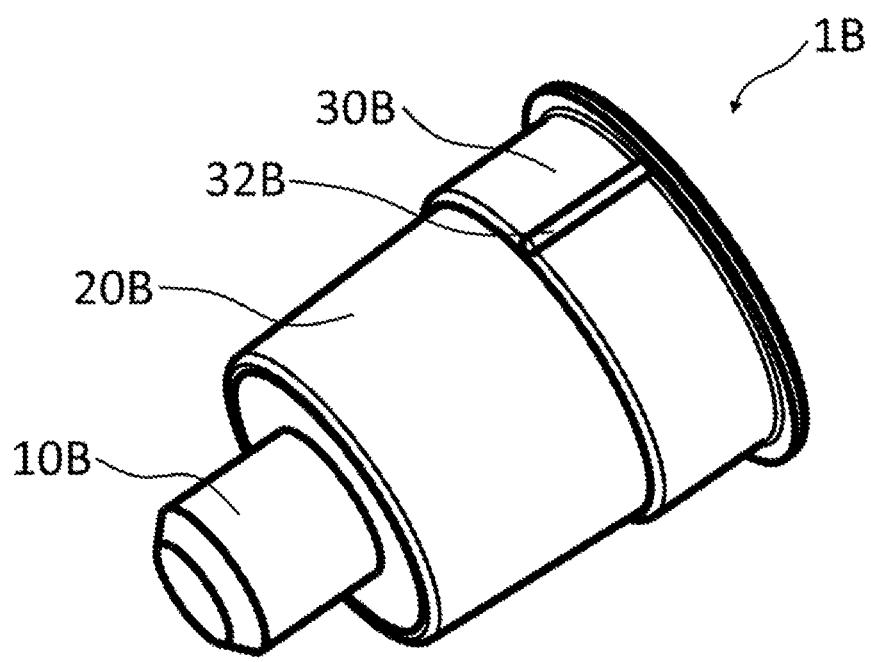

FIGS. 3A and 3B each show a perspective view of a coupling device 1B of an oscillation damper according to a third embodiment. The coupling device 1B includes a damping mass mounting element 10B, which is formed substantially cylindrically.

The coupling device 1B further includes a spring element 20B, which is arranged on the damping mass mounting element 10B. The spring element 20B is formed substantially cylindrically. The spring element 20B is formed substantially hollow-cylindrically and at least partially surrounds the damping mass mounting element 10B. The spring element 20B is designed to transmit mechanical energy or oscillations from the holder mounting element 30B to the damping mass mounting element 10B.

The spring element 20B includes an abutment configuration 24B projecting radially inward from the spring element 20B to limit the radial displacement of the holder mounting element 30B and the damping mass mounting element 10B relative to each other. Specifically, the abutment configuration 24B is an elastic abutment configuration 24B and formed integrally with the spring element 20B.

The coupling device 1B further includes a holder mounting element 30B, which is disposed on the spring element 20B and at least partially surrounds the spring element 20B. The holder mounting element 30B includes an axial position element 32B designed to engage the holder 50B in the mounted state to provide an anti-rotation configuration against relative rotational movements between the holder 50B and the damping mass 40B.

Figure 3C:
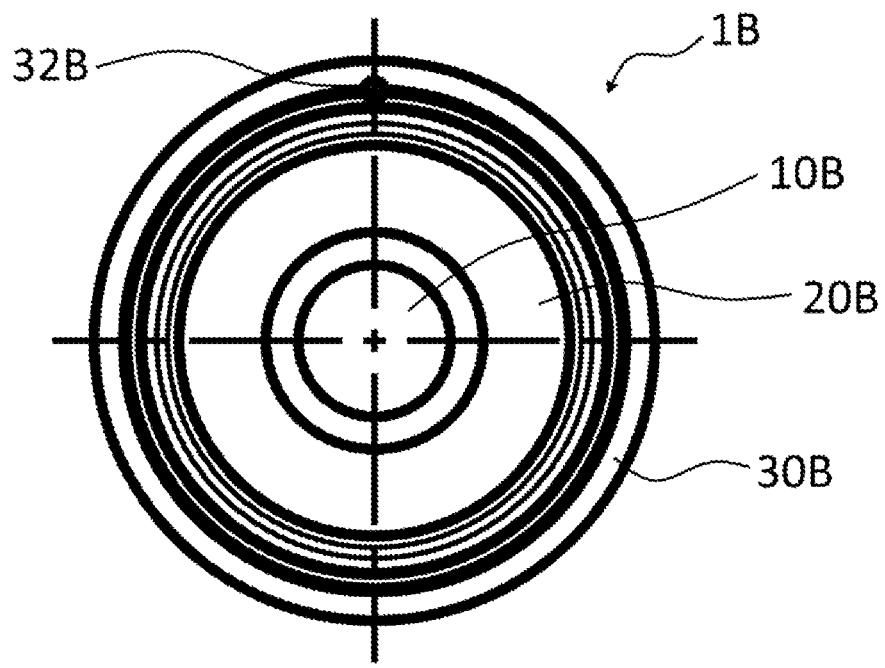
FIG. 3C shows a front view of the coupling device of FIGS. 3A and 3B along the longitudinal axis.

FIG. 3C shows a front view of the coupling device 1B of the oscillation damper according to the third embodiment along the longitudinal axis "A". In this case, the coupling device 1B has a substantially circular cross-section.

Figure 3D:
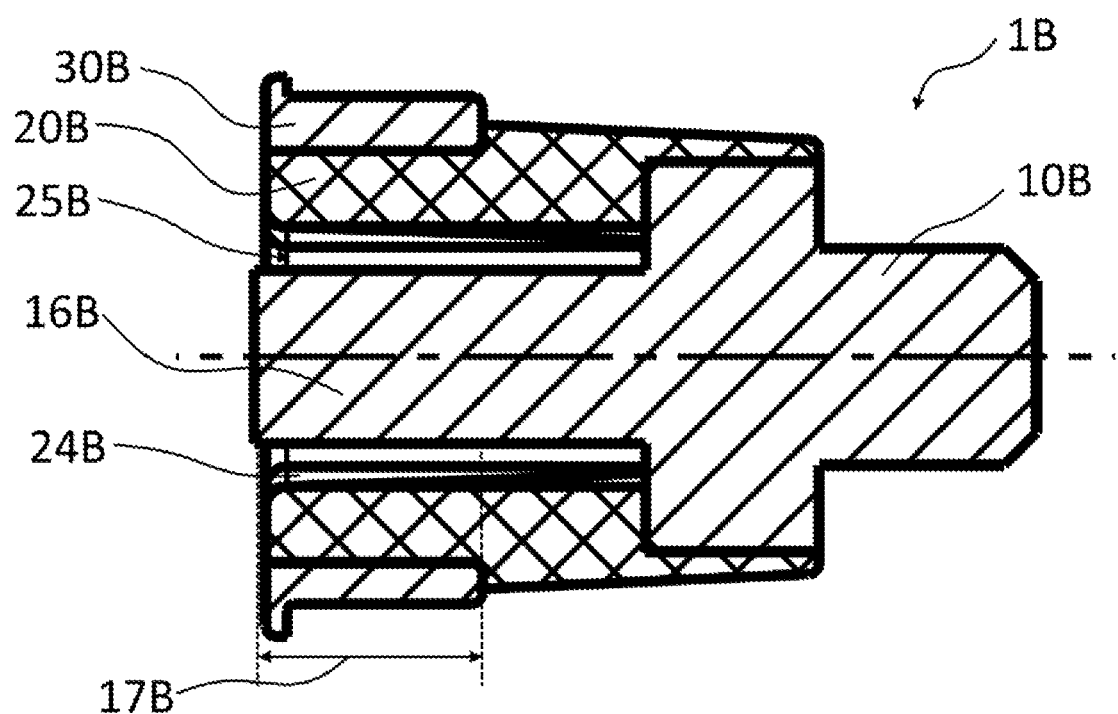
FIG. 3D shows a cross-sectional view of the coupling device of FIGS. 3A and 3B.

FIG. 3D shows a cross-sectional view of the coupling device 1B of the oscillation damper according to the third embodiment. An inner surface of the holder-mounting element 30B is directly adjacent to the spring element 20B. The spring element 20B has a central recess 25B for receiving the damping mass mounting element 10B. The central recess 25B is formed parallel and concentric with the longitudinal axis "A" of the coupling device 1B. As a result, spring properties of the spring element 20 can be adjusted or adapted easily and cost-effectively, for example by adjusting a diameter of the central recess 25B.

The holder mounting element 30B is formed substantially hollow cylindrical. Here, an abutment portion 16B of the damping mass mounting element 10B is at least partially radially surrounded by the holder mounting element 30B. Specifically, the abutment configuration 24B protrudes radially inward and is arranged opposite to the abutment portion 16B of the damping mass-mounting element 10B, so as to limit the radial displacement of the holder mounting element 30B and the damping mass mounting element 10B relative to each other.

The damping mass mounting element 10B is formed to be at least partially receivable in the hollow cylinder-like or hollow cylindrical mounting element 30B in the mounted state of the oscillation damper. A region of the damping mass mounting element 10B that is at least partially receivable in the hollow cylinder-like or hollow cylindrical mounting element 30B forms an overlap region 17B. In other words, the coupling device 1B or the damping mass mounting element 10B may have an overlap region 17B that is at least partially receivable in the holder mounting element 30B in the mounted state. The overlap region 17B enables loss prevention of the coupling device 1B in the mounted state. The damping mass 40B, which is rigidly connected to the damping mass mounting element 10B, is not completely released from the holder 50B or the holder mounting element 30B, even in the case of damage and/or destruction of the spring element 20.

Figure 3E:
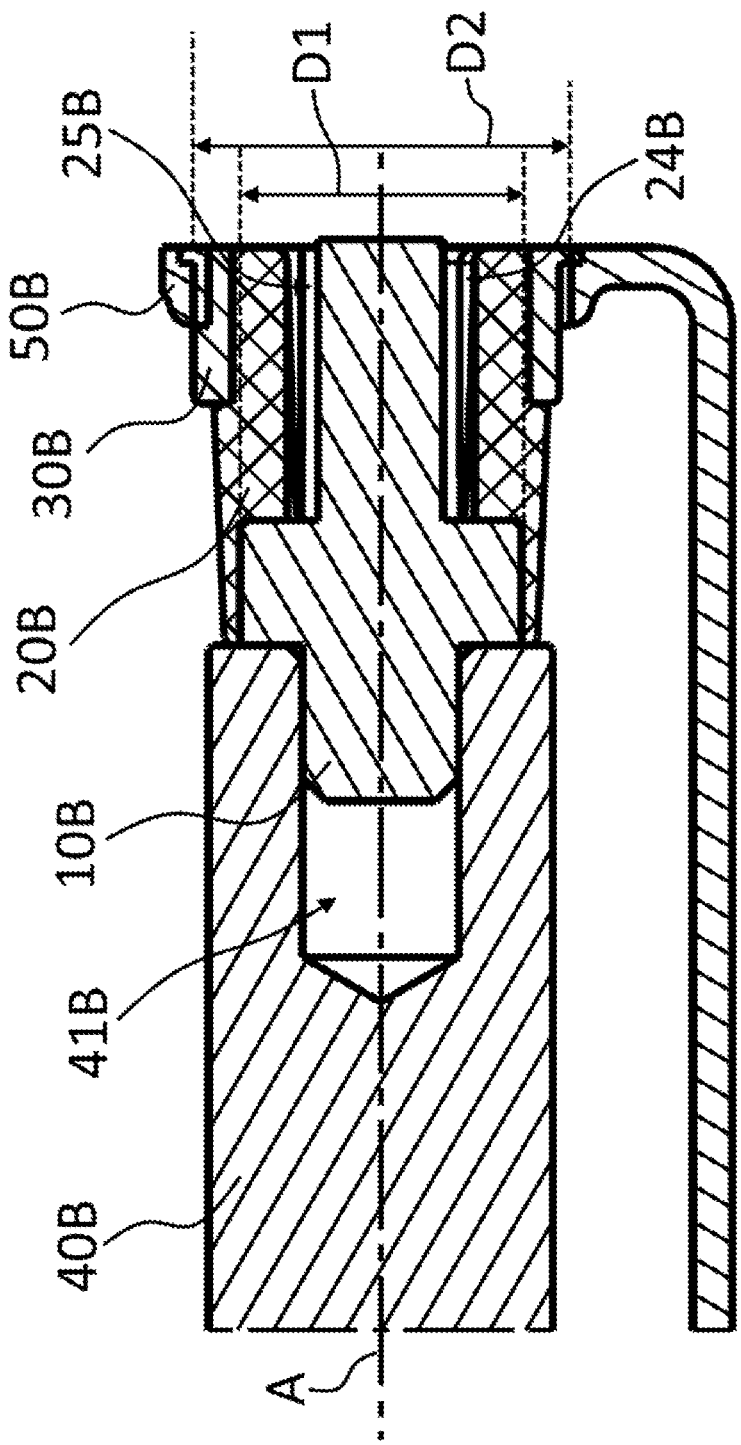
FIG. 3E shows a cross-sectional view of an oscillation damper according to the third embodiment in the mounted state.

FIG. 3E shows a cross-sectional view of the oscillation damper according to the third embodiment in the mounted state. In this case, the damping mass mounting element 10B is pressed into a damping mass mounting recess 41B of the damping mass 40B. Here, the spring element 20B only has partial contact with the damping mass 40B. The spring element 20B may have the function of a seal of the damping mass mounting recess 41B. The holder mounting element 30B is at least partially received in a receptacle of the holder 50B.

The holder 50B has a holder mounting recess (without reference numeral for illustrative purposes). The holder mounting element 30B can be pressed into the holder mounting recess or is pressed thereinto in the mounted state to form a press-fit connection. The holder mounting element 30B directly adjoins or is directly adjacent to the holder 50B in the mounted state of the oscillation damper in the holder mounting recess.

In this case, the damping mass mounting element 10B has a maximum diameter D1. The diameter D1 of the damping mass mounting element 10B is measured perpendicular to the longitudinal axis "A" in the mounted state of the oscillation damper. In this case, furthermore, the holder mounting recess has a minimum diameter D2. The diameter D2 of the holder mounting recess is measured perpendicular to the longitudinal axis "A" in the mounted state of the oscillation damper. Specifically, the maximum diameter D1 of the damping mass mounting element 10B is smaller than the minimum diameter D2 of the holder mounting recess.

In this case, the coupling device 1B, for example the damping mass mounting element 10B, can be inserted through the holder 50B or the mounting mounting recess of the holder 50B and can be pressed into the damping mass 40B or into the damping mass mounting recess 41B to form a press-fit connection. Thereby, the assembling process of the damper mass 40B to the holder 50B can be performed in one process step. In other words, pressing of the holder mounting element 30B into the holder mounting recess and the pressing of the damping mass mounting element 10B into the damping mass mounting recess 41B can take place substantially simultaneously.

Figure 4A:
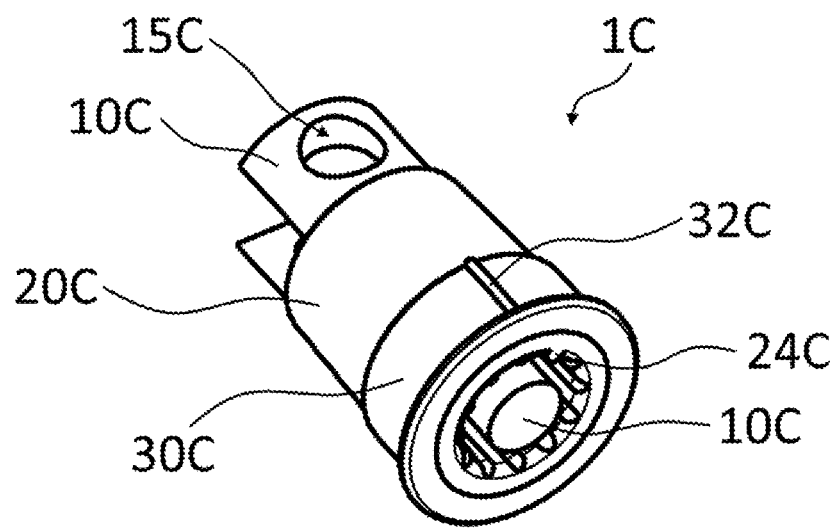
FIGS. 4A and 4B each shows a perspective view of a coupling device of an oscillation damper according to a fourth embodiment.
Figure 4B:
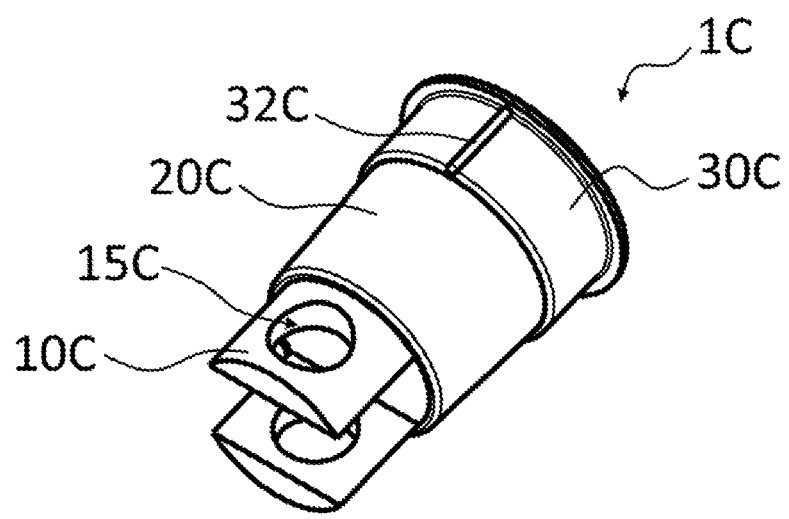

FIGS. 4A and 4B each show a perspective view of a coupling device 1C of an oscillation damper according to a fourth embodiment. The coupling device 1C includes a damping mass mounting element 10C, which includes two mounting arms each having a fixation bore 15C. The two mounting arms are arranged opposite to each other and are separated by a damping mass receptacle. The damping mass receptacle is designed to at least partially receive the damping mass. The damping mass can have a fixation bore. A connection element can be arranged at least partially in the two fixation bores of the mounting arms and the fixation bore of the damping mass, in order to secure or fix the damping mass to the damping mass mounting element.

The coupling device 1C further includes a spring element 20C, which is arranged on the damping mass mounting element 10C. The spring element 20C is formed to be substantially cylinder-like. The spring element 20C is formed to be substantially hollow-cylinder-like and at least partially surrounds the damping mass mounting element 10C. The spring element 20C is designed to transmit mechanical energy or oscillations from the holder.

The spring element 20C includes an abutment configuration 24C projecting radially inward from the spring element 20C to limit the radial displacement of the holder mounting element 30C and the damping mass mounting element 10C relative to each other. The abutment configuration 24C is an elastic abutment configuration 24C and integrally formed with the spring element 20C.

The coupling device 1C further includes a holder mounting element 30C, which is disposed on the spring element 20C and at least partially surrounds the spring element 20C. The holder mounting element 30C includes an axial position element 32C, which is designed to engage the holder in the mounted state to provide an anti-rotation configuration against relative rotational movement between the holder and the damping mass.

Figure 4C:
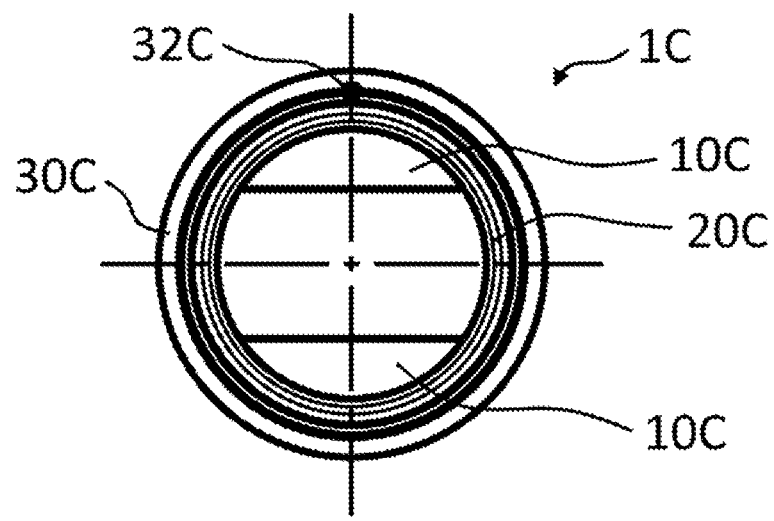
FIG. 4C shows a front view of the coupling device of FIGS. 4A and 4B along the longitudinal axis.

FIG. 4C shows a front view of the coupling device 1C of the oscillation damper according to the fourth embodiment along the longitudinal axis "A". The coupling device 1C here has a substantially circular cross-section. The two mounting arms may be substantially rotationally symmetrical to each other with respect to the longitudinal axis "A".

Figure 4D:
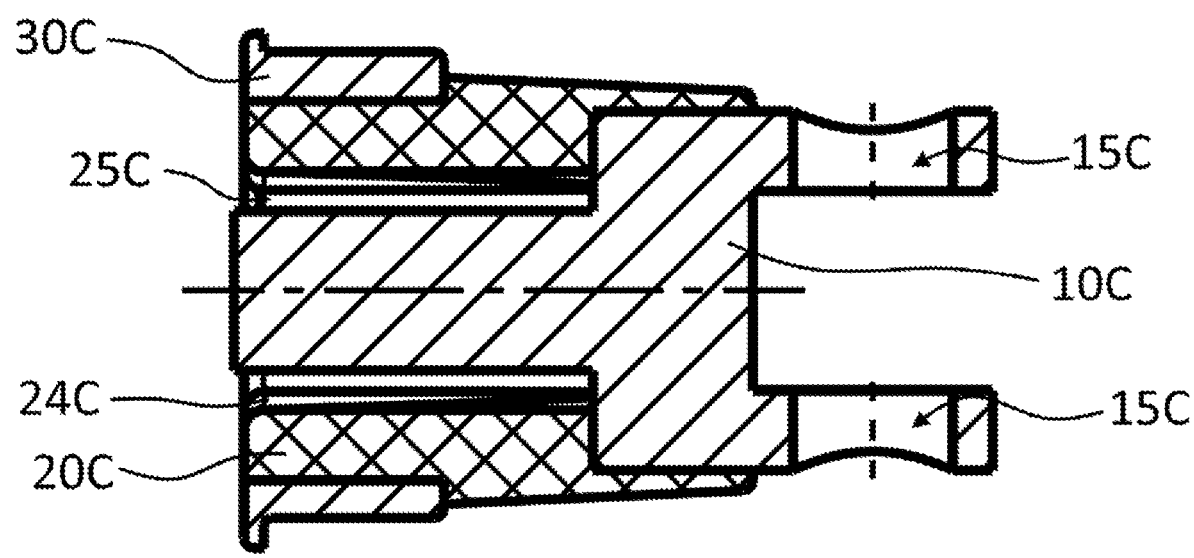
FIG. 4D shows a cross-sectional view of the coupling device of FIGS. 4A and 4B.

FIG. 4D shows a cross-sectional view of the coupling device 1C of the oscillation damper according to the fourth embodiment. An inner surface of the holder mounting element 30C is directly adjacent to the spring element 20C. The spring element 20C has a central recess 25C for receiving the damping mass mounting element 10C. The central recess 25C is formed parallel and concentric with the longitudinal axis "A" of the coupling device 1C. Thereby, spring properties of the spring element 20C can be adjusted or adapted easily and cost-effectively, for example by adjusting a diameter of the central recess 25C.

The disclosure is not limited to the exemplary embodiments described in the description and/or shown in the figures. Rather, an oscillation damper and/or a method for manufacturing an oscillation damper can have any combination of the features mentioned above and/or in the figures.

What is claimed is:

1. An oscillation damper, comprising:
   a holder, configured to mount the oscillation damper on an object to be damped;
   a damping mass;
   a coupling device, configured to mount the damping mass on the holder, wherein the coupling device comprises:
      a damping mass mounting element, which is rigidly connectable to the damping mass;
      a holder mounting element, which is rigidly connectable to the holder; and
      a spring element, which resiliently mechanically couples the damping mass mounting element with the holder mounting element;
   wherein the holder has a holder mounting recess, and
   wherein the holder mounting element is pressable into the holder mounting recess, and optionally,
   wherein the holder mounting element directly borders and/or lies directly adjacent the holder in a mounted state;
   wherein the holder mounting element is formed substantially hollow-cylindrically,
   wherein an abutment portion on the damping mass mounting element is arranged at least partially radially surrounded by the holder mounting element,
   wherein an abutment configuration is arranged on the holder mounting element projecting radially inward and/or is arranged on the abutment portion of the damping mass mounting element projecting radially outward, in order to limit a relative radial displacement of the holder mounting element and the damping mass mounting element.

2. The oscillation damper according to claim 1, wherein the damping mass has a damping mass mounting recess, wherein the damping mass mounting element is pressable into the damping mass mounting recess, and, optionally,
   wherein the damping mass mounting element in a pressed state into the damping mass mounting recess directly borders and/or lies directly adjacent the damping mass.

3. The oscillation damper according to claim 2, further comprising:
   at least one abutment element, being arranged on the holder mounting element,
   wherein the at least one abutment element abuts an inner surface of the damping mass mounting recess during radial displacement.

4. The oscillation damper according to claim 3, wherein the at least one abutment element is formed integrally with the spring element.

5. The oscillation damper according to claim 1, wherein a diameter of the damping mass mounting element is smaller than a diameter of the holder mounting recess.

6. The oscillation damper according to claim 1, wherein the abutment configuration is formed integrally with the spring element.

7. The oscillation damper according to claim 1, wherein the damping mass and the damping mass mounting element each have a fixation bore, such that the damping mass mounting element is connectable with the damping mass by means of a connection element.

8. The oscillation damper according to claim 1, wherein the holder mounting element and/or the holder have an anti-rotation configuration.

9. The oscillation damper according to claim 1, wherein the spring element is designed to exhibit different spring properties in two orthogonal radial directions.

10. The oscillation damper according to claim 1, wherein the spring element has an adjustment recess.

11. A method for manufacturing an oscillation damper, comprising:
    providing a damping mass and a holder for mounting the oscillation damper on an object to be damped;
    rigidly connecting a damping mass mounting element of a coupling device with the damping mass;
    rigidly connecting a holder mounting element of the coupling device with the holder, wherein the damping mass mounting element is coupled resiliently mechanically by a spring element with the holder mounting element;
    wherein the holder has a holder mounting recess, and
    wherein the holder mounting element is pressable into the holder mounting recess, and optionally,
    wherein the holder mounting element directly borders and/or lies directly adjacent the holder in a mounted state;
    wherein the holder mounting element is formed substantially hollow-cylindrically,
    wherein an abutment portion on the damping mass mounting element is arranged at least partially radially surrounded by the holder mounting element,
    wherein an abutment configuration is arranged on the holder mounting element projecting radially inward and/or is arranged on the abutment portion of the damping mass mounting element projecting radially outward, in order to limit a relative radial displacement of the holder mounting element and the damping mass mounting element.

12. The method according to claim 11, further comprising:
    introducing the coupling device through a holder mounting recess of the holder,
    wherein the connecting of the damping mass mounting element with the damping mass and the connecting of the holder mounting element with the holder occurs substantially simultaneously.

* * * * *